US008491265B2

(12) United States Patent  
Cottrell

(10) Patent No.: US 8,491,265 B2  
(45) Date of Patent: Jul. 23, 2013

(54) ROTOR IMBALANCE LOAD LIMITING SYSTEM AND METHOD

(75) Inventor: Brian Cottrell, Litchfield Park, AZ (US)

(73) Assignee: Honeywell International Inc., Morristown, NJ (US)

(*) Notice: Subject to any disclaimer, the term of this patent is extended or adjusted under 35 U.S.C. 154(b) by 694 days.

(21) Appl. No.: 12/758,569

(22) Filed: Apr. 12, 2010

(65) Prior Publication Data

US 2011/0250052 A1 Oct. 13, 2011

(51) Int. Cl.
F01D 25/16 (2006.01)

(52) U.S. Cl.
USPC .......................................... 416/145; 416/500

(58) Field of Classification Search
USPC ............... 74/573.1; 384/99, 535, 581; 415/1, 415/119; 416/144, 145, 500; 417/273, 471, 417/491
See application file for complete search history.

(56) References Cited

U.S. PATENT DOCUMENTS

| | | | |
|---|---|---|---|
| 2,659,243 A | 11/1953 | Darrieus | |
| 2,778,243 A | 1/1957 | Darrieus | |
| 3,158,039 A | 11/1964 | Favrot | |
| 3,248,967 A | 5/1966 | Lewis | |
| 3,277,740 A | 10/1966 | Favrot | |
| 3,744,380 A * | 7/1973 | Steiger | 92/61 |
| 3,812,724 A | 5/1974 | Curtz et al. | |
| 3,946,641 A * | 3/1976 | Hirmann | 91/491 |
| 4,002,086 A * | 1/1977 | Reinhall | 74/573.11 |
| 4,295,387 A | 10/1981 | Zhivotov et al. | |
| 4,990,062 A * | 2/1991 | Swank | 417/211 |
| 5,197,010 A | 3/1993 | Andersson | |
| 5,490,436 A | 2/1996 | Coyne et al. | |
| 5,860,865 A | 1/1999 | Smith | |
| 5,970,820 A | 10/1999 | Smith | |
| 6,030,185 A * | 2/2000 | Feigel et al. | 417/273 |
| 7,300,260 B1 * | 11/2007 | Gandrud | 417/273 |
| 7,517,152 B1 * | 4/2009 | Walsh | 384/99 |
| 2011/0250052 A1 * | 10/2011 | Cottrell | 415/33 |

* cited by examiner

Primary Examiner — Edward Look
Assistant Examiner — Christopher R Legendre
(74) Attorney, Agent, or Firm — Ingrassia Fisher & Lorenz, P.C.

(57) ABSTRACT

Methods and apparatus are provided for limiting the load on a rotor support structure when a rotationally mounted rotor becomes imbalanced. The rotor is rotationally mounted within a plurality of circumferentially spaced variable volume hydraulic fluid receptacles that at least engage the rotor and have hydraulic fluid disposed therein. Each of the variable volume hydraulic fluid receptacles is fluidly connected to a substantially fixed volume hydraulic fluid receptacle that has hydraulic fluid disposed therein and is coupled to the rotor support structure. When the rotor becomes imbalanced, the hydraulic fluid is continuously moved between the variable volume hydraulic fluid receptacles and the substantially fixed volume hydraulic fluid receptacle.

16 Claims, 4 Drawing Sheets

ROTOR IMBALANCE LOAD LIMITING SYSTEM AND METHOD

TECHNICAL FIELD

The present invention generally relates to rotor support structures, and more particularly relates to a system and method for limiting the load on rotor support structures following an event that causes a rotor imbalance.

BACKGROUND

The rotor support structures for some rotating machines are structurally sized to withstand the loads that may occur following a postulated rotor imbalance event. For example, the rotor support structure for many aircraft gas turbine engines is sized to withstand a postulated blade loss event. Such an event, as may be appreciated, would result in relatively high imbalance loads. Designing the engine to withstand such an event can result in an undesirably heavy engine, which in turn can result in undesirable fuel burn.

Presently, rotor support structures are designed to withstand the loads associated with a postulated rotor imbalance event in a number of ways. For example, the rotor support structure may be designed with sufficient structural capacity to withstand worst case rotor imbalance loads. This solution can result in an undesirably heavy machine. Alternatively, machine weight can be controlled by limiting the imbalance load that may be supplied to the support structure. This can be accomplished through the use of a frangible support section that fails at a predetermined load, or the use of a buckling section that collapses at a predetermined load. Another solution is to control the load that may be supplied to the support structure through the use of limited stiffness within the load path to the support structure. With this latter solution the imbalanced rotor is allowed to orbit about a point near its center of gravity while maintaining acceptable load in the support structure.

Each of the solutions described above, while certainly acceptable and used, do suffer certain drawbacks. For example, as was already noted, designing the support structure with sufficient structural capacity to withstand worse case rotor imbalance loads can undesirably increase machine weight. The frangible support sections and buckling sections are sacrificial components that must be replaced following a rotor imbalance event. Further, it presents a design challenge to create a frangible feature that will fail at a single occurrence of a load scarcely above maximum normal operational loads while maintaining adequate fatigue strength margin of safety at maximum operational loads. The limited stiffness solution can make it difficult to adequately control rotor centerline position in rotor imbalance, maneuver, or bird strike events within the intended operational envelope.

Hence, there is a need for a system and method for limiting rotor imbalance loads supplied to rotor support structures that does not undesirably increase machine weight and/or does not rely on sacrificial components and/or does not make it difficult to control rotor centerline position following a rotor imbalance event. The present invention addresses at least these needs.

BRIEF SUMMARY

In one embodiment, a rotor imbalance load limiting system includes a plurality of circumferentially spaced variable volume hydraulic fluid receptacles, a substantially fixed volume hydraulic fluid receptacle, a plurality of flow passages, a plurality of circumferentially spaced pistons, a plurality of first check valves, and a plurality of second check valves. Each variable volume hydraulic fluid receptacle has hydraulic fluid disposed therein. The substantially fixed volume hydraulic fluid receptacle surrounds the plurality of variable volume hydraulic fluid receptacles and has hydraulic fluid disposed therein. The plurality of flow passages interconnects the fixed volume hydraulic fluid receptacle with each of the variable volume hydraulic fluid receptacles. Each piston at least engages one of the variable volume hydraulic fluid receptacles and is adapted for at least engaging an outer race of a bearing assembly. Each of the first check valves is disposed at least partially within one of the flow passages and is configured to selectively allow hydraulic fluid to flow from one of the variable volume hydraulic fluid receptacles into the fixed volume hydraulic fluid receptacle. Each of the second check valves is disposed at least partially within one of the flow passages and is configured to selectively allow hydraulic fluid to flow from the fixed volume hydraulic fluid receptacle into one of the variable volume hydraulic fluid receptacles.

In another embodiment, a machine includes a rotor, a bearing assembly, and a rotor imbalance load limiting system. The bearing assembly rotationally mounts the rotor and includes an inner race and an outer race. The inner race at least engages the rotor. The rotor imbalance load limiting system at least engages the outer race of the bearing assembly and includes a plurality of circumferentially spaced variable volume hydraulic fluid receptacles, a substantially fixed volume hydraulic fluid receptacle, a plurality of flow passages, a plurality of circumferentially spaced pistons, a plurality of first check valves, and a plurality of second check valves. Each variable volume hydraulic fluid receptacle has hydraulic fluid disposed therein. The substantially fixed volume hydraulic fluid receptacle surrounds the plurality of variable volume hydraulic fluid receptacles and has hydraulic fluid disposed therein. The plurality of flow passages interconnects the fixed volume hydraulic fluid receptacle with each of the variable volume hydraulic fluid receptacles. Each piston at least engages one of the variable volume hydraulic fluid receptacles and at least engages the outer race of the bearing assembly. Each of the first check valves is disposed at least partially within one of the flow passages and is configured to selectively allow hydraulic fluid to flow from one of the variable volume hydraulic fluid receptacles into the fixed volume hydraulic fluid receptacle. Each of the second check valves is disposed at least partially within one of the flow passages and is configured to selectively allow hydraulic fluid to flow from the fixed volume hydraulic fluid receptacle into one of the variable volume hydraulic fluid receptacles.

In yet another embodiment, a method of limiting load on a rotor support structure when a rotationally mounted rotor becomes imbalanced includes rotationally mounting the rotor within a plurality of circumferentially spaced variable volume hydraulic fluid receptacles that at least engage the rotor and have hydraulic fluid disposed therein. Each of the variable volume hydraulic fluid receptacles is fluidly connected to a substantially fixed volume hydraulic fluid receptacle that has hydraulic fluid disposed therein and is coupled to the rotor support structure. When the rotor becomes imbalanced, the hydraulic fluid is continuously moved between the variable volume hydraulic fluid receptacles and the substantially fixed volume hydraulic fluid receptacle.

Furthermore, other desirable features and characteristics of the rotor imbalance load limiting system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although embodiments of a rotor imbalance load limiting system and method are described herein, for convenience of depicting a specific embodiment, as being implemented in a turbofan gas turbine engine, it will be appreciated that embodiments of the system and method may be implemented in any one of numerous other machines that have rotationally mounted rotors.

Figure 1:
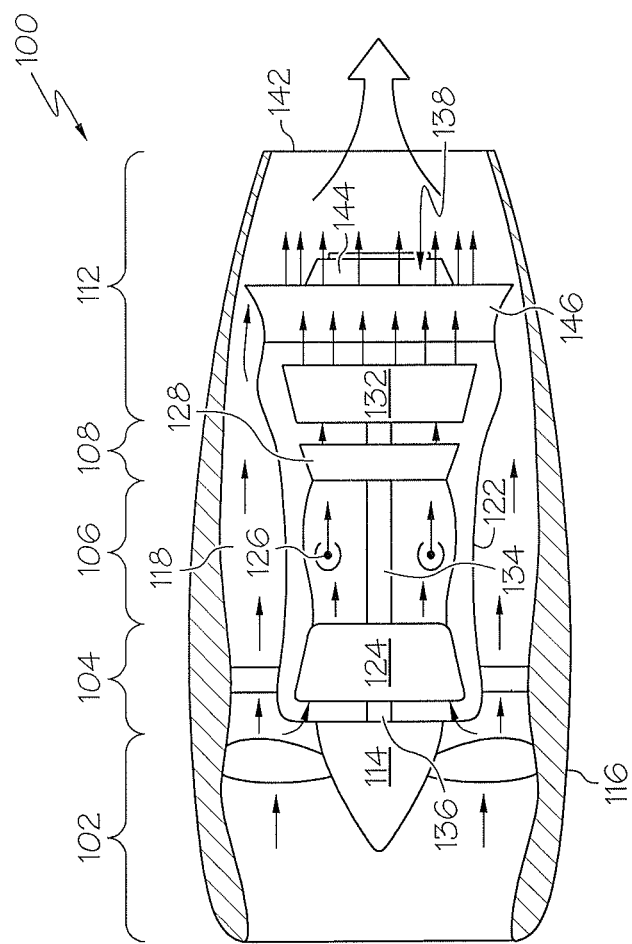
FIG. 1 depicts an embodiment of a turbofan gas turbine engine.

Turning now to FIG. 1, a functional block diagram of an exemplary turbofan gas turbine engine is depicted. The depicted engine 100 is a multi-spool turbofan gas turbine propulsion engine, and includes an intake section 102, a compressor section 104, a combustion section 106, a turbine section 108, and an exhaust section 112. The intake section 102 includes an intake fan 114, which is mounted in a nacelle assembly 116. The intake fan 114 draws air into the intake section 102 and accelerates it. A fraction of the accelerated air exhausted from the intake fan 114 is directed through a bypass flow passage 118 defined between the nacelle assembly 116 and an engine cowl 122. This fraction of air flow is referred to herein as bypass air flow. The remaining fraction of air exhausted from the intake fan 114 is directed into the compressor section 104.

The compressor section 104 may include one or more compressors 124, which raise the pressure of the air directed into it from the intake fan 114, and direct the compressed air into the combustion section 106. In the depicted embodiment, only a single compressor 124 is shown, though it will be appreciated that one or more additional compressors could be used. In the combustion section 106, which includes a combustor assembly 126, the compressed air is mixed with fuel supplied from a non-illustrated fuel source. The fuel and air mixture is combusted, and the high energy combusted fuel/air mixture is then directed into the turbine section 108.

The turbine section 108 includes one or more turbines. In the depicted embodiment, the turbine section 108 includes two turbines, a high pressure turbine 128, and a low pressure turbine 132. However, it will be appreciated that the engine 100 could be configured with more or less than this number of turbines. No matter the particular number, the combusted fuel/air mixture from the combustion section 106 expands through each turbine 128, 132, causing it to rotate. As the turbines 128 and 132 rotate, each drives equipment in the engine 100 via concentrically disposed rotors or spools. Specifically, the high pressure turbine 128 drives the compressor 124 via a high pressure rotor 134, and the low pressure turbine 132 drives the intake fan 114 via a low pressure rotor 136. The gas exhausted from the turbine section 108 is then directed into the exhaust section 112.

The exhaust section 112 includes a mixer 138 and an exhaust nozzle 142. The mixer 138 includes a centerbody 144 and a mixer nozzle 146, and is configured to mix the bypass air flow with the exhaust gas from the turbine section 108. The bypass air/exhaust gas mixture is then expanded through the propulsion nozzle 142, providing forward thrust.

Though not visible in FIG. 1, the intake fan 114 is disposed within a fan case and supported by support structure that is coupled to the nacelle assembly 116. The support structure comprises a rotor imbalance load limiting system. A cross section end view and a partial cross section side view of an embodiment of a rotor imbalance load limiting system and support structure are depicted in more detail in FIGS. 2 and 3, and with reference thereto will now be described.

Figure 2:
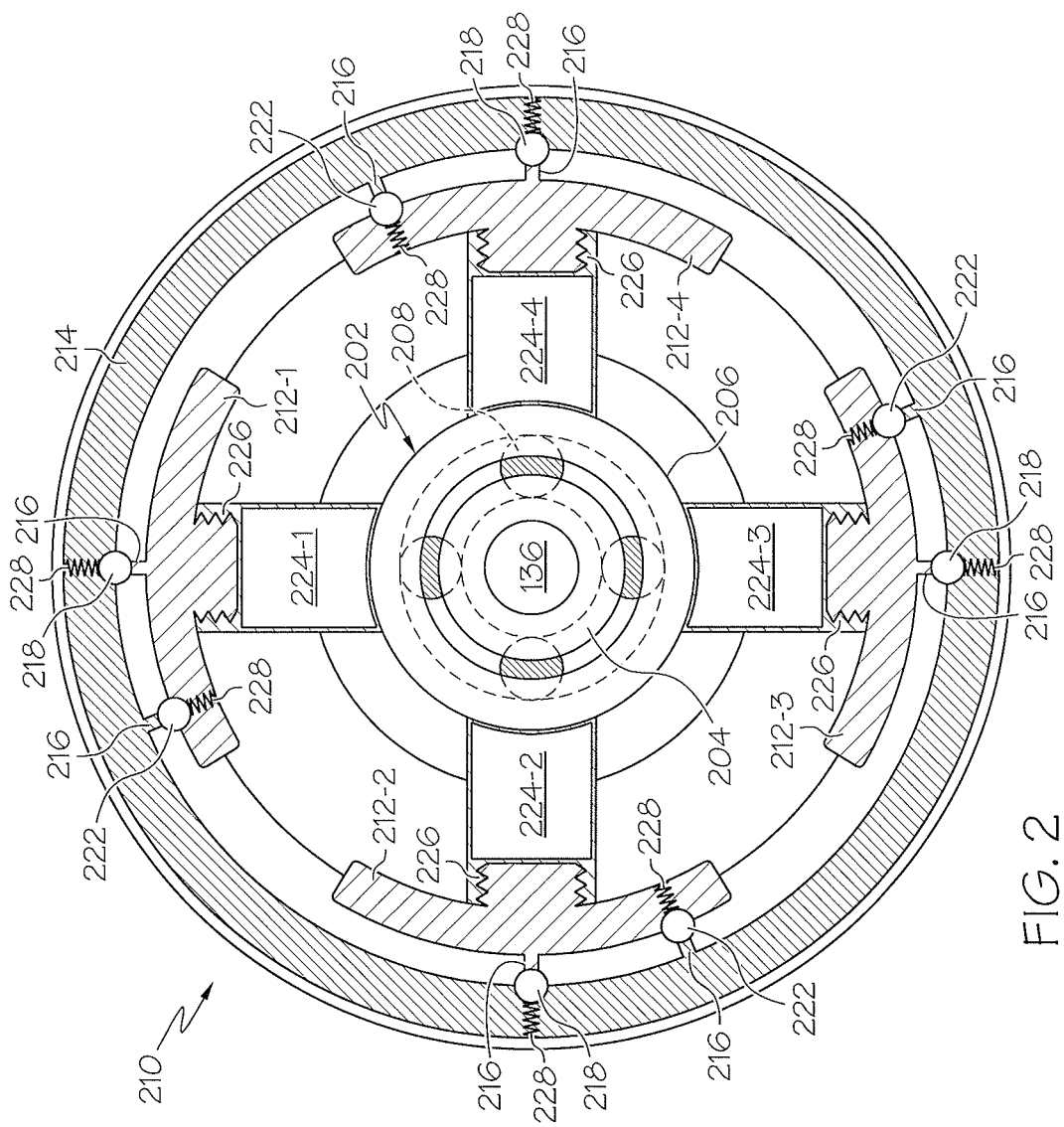
FIGS. 2 depicts a cross section end view of an embodiment of a portion of a rotor imbalance load limiting system that may be implemented in the turbofan gas turbine engine of FIG. 1.

The low pressure rotor 136 is rotationally mounted in the fan case 302 (see FIG. 3) via one or more bearing assemblies 202 (only one depicted). Although the configuration of the bearing assembly 202 may vary, in the depicted embodiment it includes an inner race 204, an outer race 206, and a plurality of bearing balls 208. The inner race 202 at least engages the low pressure rotor 136 and rotates therewith, and the outer race 206 is non-rotationally mounted. The bearing balls 208 are disposed, in appropriate grooves, within and between the inner race 204 and the outer race 206. Although four bearing balls 208 are depicted in FIG. 2, it will be appreciated that this is done merely for clarity and ease of illustration and that more than this number may be, and likely are, included.

The rotor imbalance load limiting system 210 is preferably coupled to, or at least engages, the outer race 206 of the bearing assembly 202 and the fan case 302. The rotor imbalance load limiting system 210 includes a plurality of variable volume hydraulic fluid receptacles 212, a fixed volume hydraulic fluid receptacle 214, a plurality of flow passages 216, a plurality of first check valves 218, a plurality of second check valves 222, and a plurality of circumferentially spaced pistons 224. The variable volume hydraulic fluid receptacles 212 each have a hydraulic fluid disposed therein and, as the name connotes, the fluid volume of each is variable. To implement the variable fluid volume functionality, each variable volume hydraulic fluid receptacle 212 includes a bellows 226, or other similarly functional structure. The bellows 226, as will be explained further below, may expand or retract in response to movement of an associated one of the pistons 224, to thereby vary the fluid volume of the associated variable volume hydraulic fluid receptacles 212.

In a preferred embodiment, the variable volume hydraulic fluid receptacles 212 are evenly spaced circumferentially about the low pressure rotor 136, and thus about the axis of rotation of the low pressure rotor 136. In the depicted embodiment, the system 210 includes four variable volume hydraulic fluid receptacles 212 (e.g., 212-1, 212-2, 212-3, and 212-4). It will be appreciated, however, that the system 210 could be implemented with more or less than this number of variable volume hydraulic fluid receptacles 212, though the number is preferably an even number. Moreover, the circumferential extent of each variable volume hydraulic fluid receptacle 212 may vary from what is depicted in FIG. 2. For example, each of the variable volume hydraulic fluid receptacles 212 could circumferentially extend to butt up against one another, or even share common partitioning walls.

The fixed volume hydraulic fluid receptacle 214 also has a hydraulic fluid disposed therein. As its name connotes, the fluid volume of the fixed volume hydraulic fluid receptacle 214 is fixed (or at least substantially fixed). The fixed volume hydraulic fluid receptacle 214, at least in the depicted embodiment, extends circumferentially around the variable volume hydraulic fluid receptacles 212. It will be appreciated, however, that this is merely an example of a particular preferred dispositional configuration, and that the fixed volume hydraulic fluid receptacle 214 could be alternatively disposed.

No matter the specific number or configuration of the variable volume hydraulic fluid receptacles 212, or the configuration and location of the fixed volume hydraulic fluid receptacle 214, the fixed volume hydraulic fluid volume 214 is interconnected with each of the variable volume hydraulic fluid receptacles 212 via the plurality of flow passages 216. In the depicted embodiment, each variable volume hydraulic fluid receptacle 212 is interconnected with the fixed volume hydraulic fluid receptacle 214 via two flow passages 216. It will be appreciated, however, that this is merely exemplary of a particular embodiment, and that other numbers of flow passages 216 could interconnect the fixed volume hydraulic fluid receptacle 214 with each of the variable volume hydraulic fluid receptacles 212. Moreover, the specific locations of the flow passages 216 may vary from what is depicted in FIG. 2.

The first check valves 218 and the second check valves 222 are disposed at least partially within the flow passages 216, and thus prevent the hydraulic fluid from freely moving between the variable volume hydraulic fluid receptacles 212 and the fixed volume hydraulic fluid receptacle 214. In particular, each of the first check valves 218 is disposed at least partially within one of the flow passages 216 and is configured to selectively allow hydraulic fluid to flow from one of the variable volume hydraulic fluid receptacles 212 into the fixed volume hydraulic fluid receptacle 214. The second check valves 222 are also each disposed at least partially within one of the flow passages 216. However, the second check valves 222 are each configured to selectively allow hydraulic fluid to flow from the fixed volume hydraulic fluid receptacle 214 into one of the variable volume hydraulic fluid receptacles 212.

Figure 3:
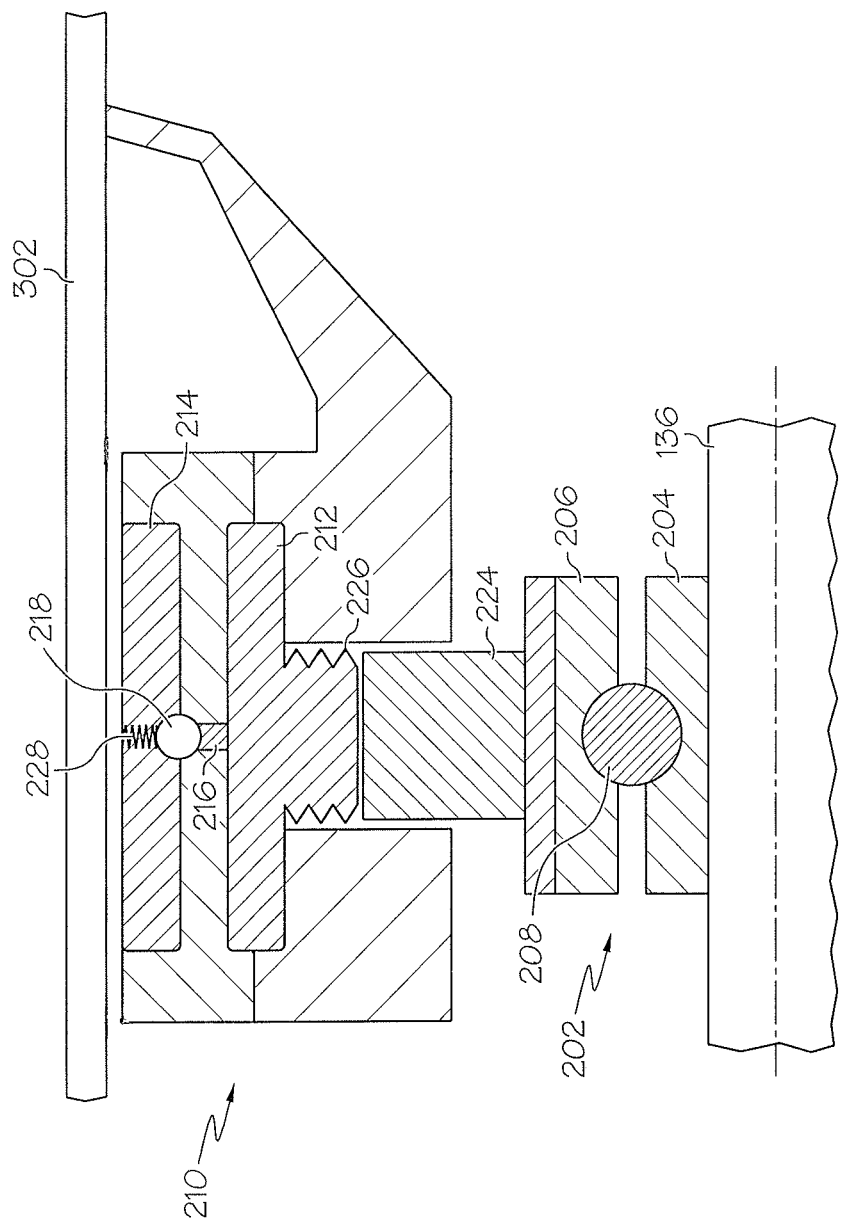
FIG. 3 depicts a cross section side view of a portion of the rotor imbalance load limiting system depicted in FIG. 2.

The first check valves 218 and the second check valves 222 are each biased to a closed position, which is the position depicted in FIGS. 2 and 3. In the closed positions, hydraulic fluid cannot move between the fixed volume hydraulic fluid receptacle 214 and the variable volume hydraulic fluid receptacles 212. In the depicted embodiment, the first check valves 218 and the second check valves 222 are biased to their respective closed positions via springs 228, though this is merely exemplary of a particular embodiment. In any case, the first check valves 218 are configured to move from the closed position to an open position, and thus allow hydraulic fluid to flow from its associated variable volume hydraulic fluid receptacle 212 into the fixed volume hydraulic fluid receptacle 214, when hydraulic fluid pressure in its associated variable volume hydraulic fluid receptacle 212 exceeds the hydraulic fluid pressure in the fixed volume hydraulic fluid receptacle 214 by a predetermined value. Similarly, each of the second check valves 222 is configured to move from the closed position to an open position, and thus allow hydraulic fluid to flow from the fixed volume hydraulic fluid receptacle 214 into its associated variable volume hydraulic fluid receptacle 212, when the hydraulic fluid pressure in the fixed volume hydraulic fluid receptacle 214 exceeds the hydraulic fluid pressure in the associated variable volume hydraulic fluid receptacle 212 by a predetermined value. The predetermined values of hydraulic pressure at which each of the first check valves 218 and the second check valves 222 move from the closed to open positions may vary, and are set, at least in part, by the bias spring force.

The fluid volumes of the variable volume hydraulic fluid receptacles 212, and thus the hydraulic fluid pressures therein, are varied in response to movement of the pistons 224. As depicted in FIG. 2, each piston 224 is preferably coupled to, or at least engages, one of the variable volume hydraulic fluid receptacles 212 and the outer race 206 of the bearing assembly 202. More specifically, each piston 224 is preferably coupled to the bellows 226 of one of the variable volume hydraulic fluid receptacles 212. The pistons 224 are preferably evenly spaced circumferentially about the low pressure rotor 136, and there is preferably the same number of pistons 224 as variable volume hydraulic fluid receptacles 212. Hence, in the depicted embodiment there are four pistons 224 (e.g., 224-1, 224-2, 224-3, and 224-4), which are preferably spaced about 90-degrees from each other. The pistons 224 locate the outer race 206 of the bearing assembly 202 within the overall system 210 and, as will now be described, selectively compress the bellows 226, and thus vary the fluid volumes of the variable volume hydraulic fluid receptacles 212 should the low pressure rotor 136 become unbalanced.

As may be appreciated, when the low pressure rotor 136 is fully balanced, the rotor imbalance load limiting system 210 is in the quiescent state depicted in FIG. 2. In this state, none of the pistons 224 are displaced and thus none of the bellows 226 are compressed. The first check valves 218 and the second check valves 222 are closed, and there is no hydraulic fluid movement between the variable volume hydraulic fluid receptacles 212 and the fixed volume hydraulic fluid receptacle 214. Assume, however, that the low pressure rotor 136, for some reason, becomes unbalanced and is initially displaced, when viewed in the context of FIG. 2, in the upward (e.g., 12 o'clock) direction. This in turn causes an imbalance force in the upward (12 o'clock) direction. The upward movement of the low pressure rotor 136 moves the piston 224-1 upward, which compresses the associated bellows 226 and causes the hydraulic fluid pressure in the variable volume hydraulic fluid receptacle 212-1 to increase. When the hydraulic fluid pressure in the variable volume hydraulic fluid receptacle 212-1 exceeds the hydraulic fluid pressure in the fixed volume hydraulic fluid receptacle 214 by the predetermined value, the associated first check valve 218 opens. As a result, hydraulic fluid flows from the variable volume hydraulic fluid receptacle 212-1 into the fixed volume hydraulic fluid receptacle 214.

As was already noted, the fluid volume of the fixed volume hydraulic fluid receptacle 214 is fixed. Thus, the flow of hydraulic fluid into the fixed volume hydraulic fluid receptacle 214 will cause the hydraulic fluid pressure therein to increase. Because the low pressure rotor 136 is, at least at this instant in time, not displaced in the leftward (9 o'clock) or rightward (3 o'clock) directions, the volumes of the variable volume hydraulic fluid receptacles 212-2, 212-4 at those locations have not changed. Thus, the associated second check valves 222 remain in their closed positions. However, the volume of the variable volume hydraulic fluid receptacle 212-3 at the 6 o'clock location has increased, causing the hydraulic fluid therein to decrease. When the hydraulic fluid pressure in the fixed volume hydraulic fluid receptacle 214 exceeds the hydraulic fluid pressure in the variable volume hydraulic fluid receptacle 212-3 by the predetermined value, the associated second check valve 222 opens. As a result, hydraulic fluid flows from the fixed volume hydraulic fluid receptacle 214 into the variable volume hydraulic fluid receptacle 212-3.

As the low pressure rotor 136 revolves about its new orbit, the system 210 settles into a state in which the hydraulic fluid is continuously moving between the variable volume hydraulic fluid receptacles 212 and the fixed volume hydraulic fluid receptacle 214. In particular, hydraulic fluid in the variable volume hydraulic fluid receptacles 212 at the maximum rotor displacement and 90-degrees ahead of the maximum rotor displacement is moving into the fixed volume hydraulic fluid cavity 214. The hydraulic fluid that is moved into in the fixed volume hydraulic fluid cavity is in turn moving into the variable volume hydraulic fluid receptacles 212 that are 180-degrees and 270-degrees ahead of the maximum rotor displacement. This movement of hydraulic fluid in the system 210 is depicted graphically in FIG. 4. It is noted that in FIG. 4 the solid lines represent the position (outward or inward of normal) of the pistons, while the dashed lines represent the direction of travel (outward or inward) and velocity of the piston.

Figure 4:
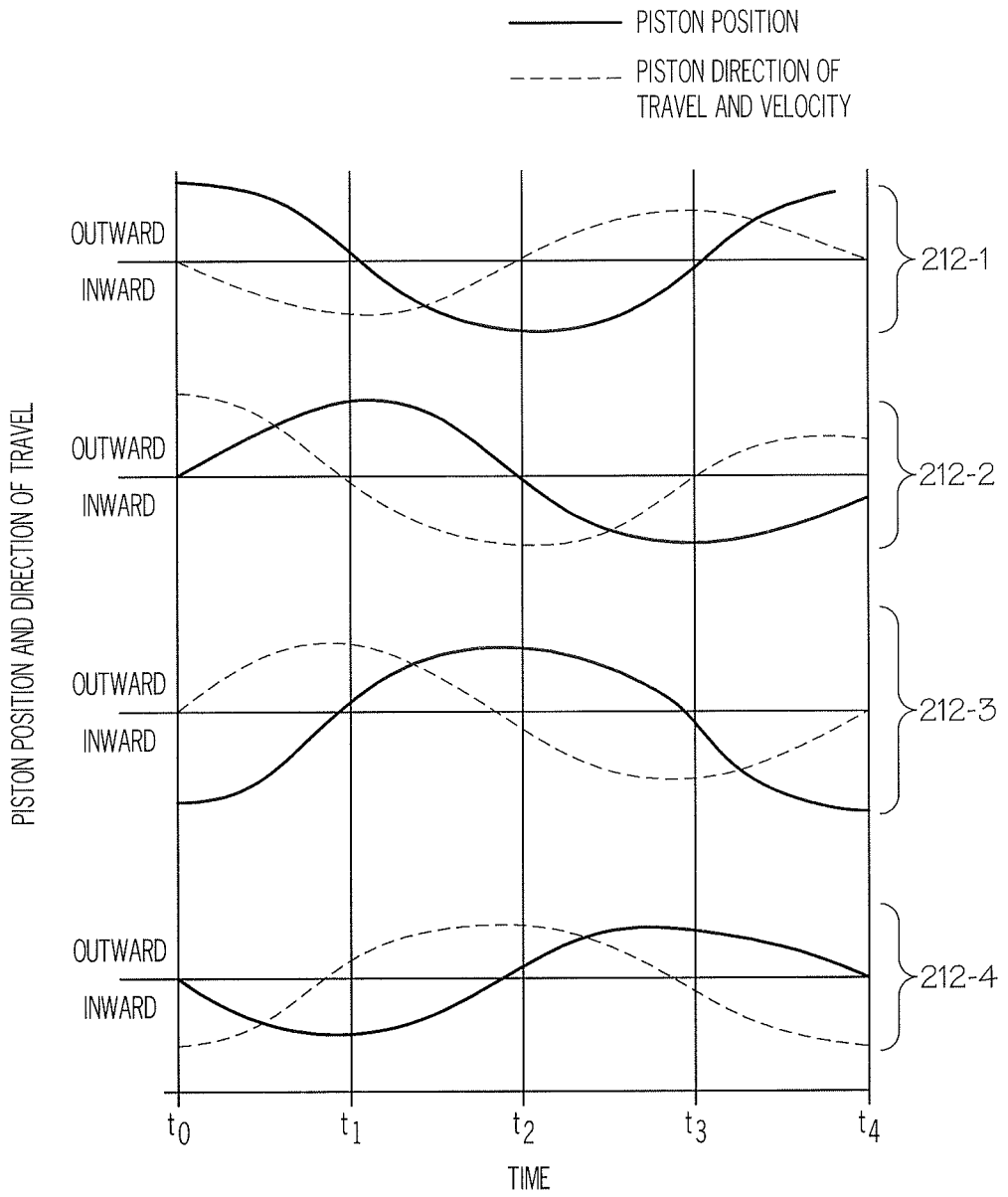
FIG. 4 graphically depicts fluid movement within the rotor imbalance load limiting system of FIG. 2.

As FIG. 4 depicts, between times $t_0$ and $t_1$, as the orbit of the low pressure rotor 136 rotates from the 12 o'clock position to the 9 o'clock position, the variable volume hydraulic fluid receptacles 212 at the 9 o'clock and 6 o'clock positions are supplying hydraulic fluid to the fixed volume hydraulic fluid receptacle 214, and the variable volume hydraulic fluid receptacles 212 at the 3 o'clock and 12 o'clock positions are receiving hydraulic fluid from the fixed volume hydraulic fluid receptacle 214. Between times $t_1$ and $t_2$, as the orbit of the low pressure rotor 136 rotates from the 9 o'clock position to the 6 o'clock position, the variable volume hydraulic fluid receptacles 212 at the 6 o'clock and 3 o'clock positions are supplying hydraulic fluid to the fixed volume hydraulic fluid receptacle 214, and the variable volume hydraulic fluid receptacles 212 at the 12 o'clock and 9 o'clock positions are receiving hydraulic fluid from the fixed volume hydraulic fluid receptacle 214.

As the orbit of the low pressure rotor 136 rotates from the 6 o'clock position to the 3 o'clock position, between times $t_2$ and $t_3$, the variable volume hydraulic fluid receptacles 212 at the 3 o'clock and 12 o'clock positions are supplying hydraulic fluid to the fixed volume hydraulic fluid receptacle 214, and the variable volume hydraulic fluid receptacles 212 at the 9 o'clock and 6 o'clock positions are receiving hydraulic fluid from the fixed volume hydraulic fluid receptacle 214. Between times $t_3$ and $t_4$, as the orbit of the low pressure rotor 136 rotates from the 3 o'clock position back to the 12 o'clock position, the variable volume hydraulic fluid receptacles 212 at the 12 o'clock and 9 o'clock positions are supplying hydraulic fluid to the fixed volume hydraulic fluid receptacle 214, and the variable volume hydraulic fluid receptacles 212 at the 6 o'clock and 3 o'clock positions are receiving hydraulic fluid from the fixed volume hydraulic fluid receptacle 214.

The system and method described herein limit rotor imbalance loads supplied to rotor support structures without undesirably increasing machine weight, without relying on sacrificial components, and not controlling rotor centerline position following a rotor imbalance event. Again, although embodiments of the rotor imbalance load limiting system and method are conveniently described herein as being implemented in a turbofan gas turbine engine, it will be appreciated that embodiments of the system and method may be implemented in any one of numerous other machines that have rotationally mounted rotors.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A machine, comprising:
   a rotor;
   a bearing assembly rotationally mounting the rotor, the bearing assembly including an inner race and an outer race, the inner race at least engaging the rotor;
   a rotor imbalance load limiting system at least engaging the outer race of the bearing assembly, the rotor imbalance load limiting system including:
   a plurality of circumferentially spaced variable volume hydraulic fluid receptacles, each variable volume hydraulic fluid receptacle comprising a bellows having hydraulic fluid disposed therein;
   a substantially fixed volume hydraulic fluid receptacle surrounding the plurality of variable volume hydraulic fluid receptacles, the substantially fixed volume hydraulic fluid receptacle having hydraulic fluid disposed therein;
   a plurality of flow passages interconnecting the substantially fixed volume hydraulic fluid receptacle with each of the variable volume hydraulic fluid receptacles;
   a plurality of circumferentially spaced pistons, each piston at least engaging one of the bellows and at least engaging the outer race of the bearing assembly;
   a plurality of first check valves, each of the first check valves disposed at least partially within one of the flow passages and configured to selectively allow hydraulic fluid to flow from one of the variable volume hydraulic fluid receptacles into the substantially fixed volume hydraulic fluid receptacle; and
   a plurality of second check valves, each of the second check valves disposed at least partially within one of the flow passages and configured to selectively allow hydraulic fluid to flow from the substantially fixed volume hydraulic fluid receptacle into one of the variable volume hydraulic fluid receptacles.

2. The machine of claim 1, wherein each of the bellows selectively expands and contracts in response to movement of the piston to which it is at least engaged.

3. The machine of claim 2, wherein:
   the variable volume hydraulic fluid receptacles are circumferentially spaced about an axis of rotation; and
   the pistons are configured to move substantially perpendicular to the axis of rotation.

4. The machine of claim 1, wherein each of the first check valves is configured to allow hydraulic fluid to flow from its associated variable volume hydraulic fluid receptacle into the substantially fixed volume hydraulic fluid receptacle when hydraulic fluid pressure in its associated variable volume hydraulic fluid receptacle exceeds hydraulic fluid pressure in the substantially fixed volume hydraulic fluid receptacle by a predetermined value.

5. The machine of claim 1, wherein each of the second check valves is configured to allow hydraulic fluid to flow from the substantially fixed volume hydraulic fluid receptacle into a variable volume hydraulic fluid receptacle when hydraulic fluid pressure in the substantially fixed volume hydraulic fluid receptacle exceeds hydraulic fluid pressure in the variable volume hydraulic fluid receptacle by a predetermined value.

6. The machine of claim 1, comprising an even number of variable volume hydraulic fluid receptacles.

7. The machine of claim 1, comprising:
four circumferentially spaced variable volume hydraulic fluid receptacles;
four pistons;
four first check valves; and
four second check valves.

8. The machine of claim 1, wherein:
each first check valve is biased to a closed position, in which hydraulic fluid does not flow from one of the variable volume hydraulic fluid receptacles into the substantially fixed volume hydraulic fluid receptacle; and
each second check valve is biased to a closed position, in which hydraulic fluid does not flow from the substantially fixed volume hydraulic fluid receptacle into one of the variable volume hydraulic fluid receptacles.

9. A rotor imbalance load limiting system, comprising:
a plurality of circumferentially spaced variable volume hydraulic fluid receptacles, each variable volume hydraulic fluid receptacle comprises a bellows having hydraulic fluid disposed therein;
a substantially fixed volume hydraulic fluid receptacle surrounding the plurality of variable volume hydraulic fluid receptacles, the substantially fixed volume hydraulic fluid receptacle having hydraulic fluid disposed therein;
a plurality of flow passages interconnecting the substantially fixed volume hydraulic fluid receptacle with each of the variable volume hydraulic fluid receptacles;
a plurality of circumferentially spaced pistons, each piston at least engaging one of the bellows and adapted for at least engaging an outer race of a bearing assembly;
a plurality of first check valves, each of the first check valves disposed at least partially within one of the flow passages and configured to selectively allow hydraulic fluid to flow from one of the variable volume hydraulic fluid receptacles into the substantially fixed volume hydraulic fluid receptacle; and
a plurality of second check valves, each of the second check valves disposed at least partially within one of the flow passages and configured to selectively allow hydraulic fluid to flow from the substantially fixed volume hydraulic fluid receptacle into one of the variable volume hydraulic fluid receptacles.

10. The system of claim 9, wherein each of the bellows selectively expands and contracts in response to movement of the piston to which it is at least engaged.

11. The system of claim 10, wherein:
the variable volume hydraulic fluid receptacles are circumferentially spaced about an axis of rotation; and
the pistons are configured to move substantially perpendicular to the axis of rotation.

12. The system of claim 9, wherein each of the first check valves is configured to allow hydraulic fluid to flow from its associated variable volume hydraulic fluid receptacle into the substantially fixed volume hydraulic fluid receptacle when hydraulic fluid pressure in its associated variable volume hydraulic fluid receptacle exceeds hydraulic fluid pressure in the substantially fixed volume hydraulic fluid receptacle by a predetermined value.

13. The system of claim 9, wherein each of the second check valves is configured to allow hydraulic fluid to flow from the substantially fixed volume hydraulic fluid receptacle into a variable volume hydraulic fluid receptacle when hydraulic fluid pressure in the substantially fixed volume hydraulic fluid receptacle exceeds hydraulic fluid pressure in the variable volume hydraulic fluid receptacle by a predetermined value.

14. The system of claim 9, comprising an even number of variable volume hydraulic fluid receptacles.

15. The system of claim 14, comprising:
four circumferentially spaced variable volume hydraulic fluid receptacles;
four circumferentially spaced pistons;
four first check valves; and
four second check valves.

16. The system of claim 9, wherein:
each first check valve is biased to a closed position, in which hydraulic fluid does not flow from one of the variable volume hydraulic fluid receptacles into the substantially fixed volume hydraulic fluid receptacle; and
each second check valve is biased to a closed position, in which hydraulic fluid does not flow from the substantially fixed volume hydraulic fluid receptacle into one of the variable volume hydraulic fluid receptacles.

* * * * *